United States Patent
Hanson et al.

(10) Patent No.: US 11,671,318 B1
(45) Date of Patent: Jun. 6, 2023

(54) POST-DEPLOYMENT UPDATING OF NETWORK DEVICE MANAGEMENT SWITCH CONFIGURATIONS

(71) Applicant: Arista Networks, Inc., Santa Clara, CA (US)

(72) Inventors: Geoffrey Hanson, San Jose, CA (US); Fai Li, San Jose, CA (US); Aaron C. Ho, San Francisco, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/826,743

(22) Filed: May 27, 2022

(51) Int. Cl.
| G06F 15/177 | (2006.01) |
| H04L 41/0813 | (2022.01) |
| H04L 41/0853 | (2022.01) |

(52) U.S. Cl.
CPC ...... H04L 41/0813 (2013.01); H04L 41/0853 (2013.01)

(58) Field of Classification Search
CPC .................. H04L 41/0813; H04L 41/0853
USPC ......................................................... 709/221
See application file for complete search history.

(56) References Cited

FOREIGN PATENT DOCUMENTS

| CN | 112087337 A | * | 12/2020 | |
| CN | 115412452 A | * | 11/2022 | |
| ES | 2905499 T3 | * | 4/2022 | ......... H04L 41/0813 |

* cited by examiner

Primary Examiner — Hee Soo Kim

(57) ABSTRACT

A network device, method, and non-transitory computer readable medium storing computer readable program code, for the post-deployment updating of network device management switch configurations. Particularly, in overcoming limitations imposed by the current state of technology, embodiments disclosed herein enable and implement multiple-master, single-slave interactions amongst network device hardware and using communication protocols otherwise designed to support single-master, single- or multiple-slave(s) configurations. Further, through said multiple-master, single-slave interactions, embodiments disclosed herein facilitate the in-the-field modification of management switch configurations across scenarios following and/or during deployment of network devices in networks.

20 Claims, 9 Drawing Sheets

POST-DEPLOYMENT UPDATING OF NETWORK DEVICE MANAGEMENT SWITCH CONFIGURATIONS

BACKGROUND

A network device (e.g., network switch, network router, etc.) may often include a management system-on-a-chip (SoC), also referred to as a management switch, which may allow for maintenance of the network device. The management switch, in turn, may have access to non-volatile memory that stores a management switch configuration, which when read by the management switch, enables the management switch to behave in accordance with a chosen functionality.

DETAILED DESCRIPTION

Figure 1A:
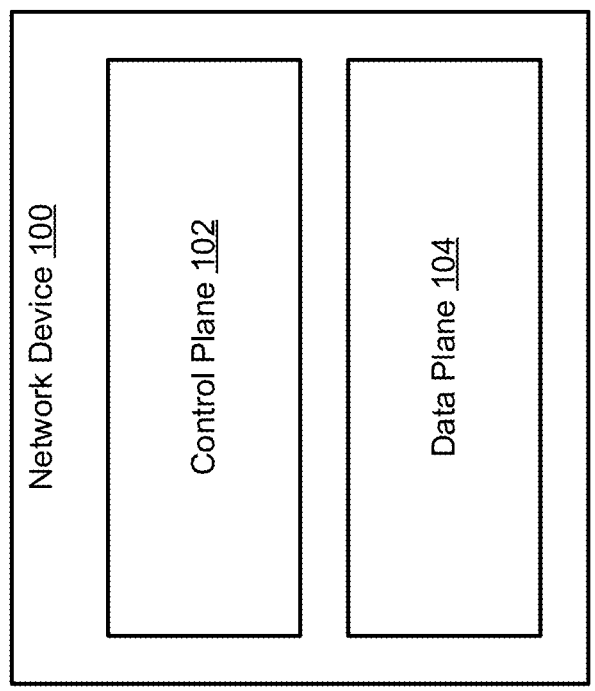
FIG. 1A shows a network device in accordance with one or more embodiments disclosed herein.

Specific embodiments disclosed herein will now be described in detail with reference to the accompanying figures.

In general, embodiments disclosed herein relate to post-deployment updating of network device management switch configurations. Particularly, in overcoming limitations imposed by the current state of technology (described below), embodiments disclosed herein enable and implement multiple-master, single-slave interactions amongst network device hardware and using communication protocols otherwise designed to support single-master, single- or multiple-slave(s) configurations. Further, through said multiple-master, single-slave interactions, embodiments disclosed herein facilitate the in-the-field modification of management switch configurations across scenarios following and/or during deployment of network devices in networks.

A network device (e.g., network switch, network router, etc.) may often include a management system-on-a-chip (SoC), also referred to as a management switch, which may allow for maintenance of the network device. The management switch, in turn, may have access to non-volatile memory that stores a management switch configuration, which when read by the management switch, enables the management switch to behave in accordance with a chosen functionality.

With the current state of technology, the programming of a management switch configuration into said non-volatile memory is restricted to the manufacturing phase of the network device. Further, once programmed, the stored management switch configuration, and thus the behavior of the management switch, remains immutable throughout the deployment life of the network device. This is the case because the current technological state is limited to hardware design and communication protocols (e.g., microwire (µwire) and serial peripheral interface (SPI)) that can only support single-master, single- or multiple-slave(s) configurations. Scenarios, however, exist where modification(s) to and/or replacement of the management switch configuration, following and during deployment of the network device, may be desirable. By way of an example, it may be necessary for the management switch to create a set of virtual broadcast domains for a length-of-time, and thereafter, replace the set of virtual broadcast domains with another set of virtual broadcast domains for a later length-of-time, along the deployment life of a network device. The current state of technology lacks the required flexibility to address these scenarios.

In facilitating the updating of management switch configurations on post-deployed network devices, embodiments disclosed herein overcome the above-mentioned shortfall of the current state of technology. To that end, in addition to the management switch, embodiments disclosed herein further permit access of the non-volatile memory—storing the management switch configuration—to a network device system controller (e.g., a complex programmable logic device (CPLD)). Therefore, while the management switch may read from the non-volatile memory to behave accordingly based on a stored management switch configuration, the system controller may write to the non-volatile memory to replace or modify the stored management switch configuration.

Embodiments disclosed herein, moreover, regulate access of the non-volatile memory, by the management switch or the system controller, thereby preventing issues that may arise from concurrent reading from and writing to the non-volatile memory. The aforementioned regulation of non-volatile memory access may be facilitated using existing network device hardware such as, for example, through the repurpo sing of unused multiplexers.

In the following detailed description of the embodiments disclosed herein, numerous specific details are set forth in order to provide a more thorough understanding of the various embodiments. However, it will be apparent to one of ordinary skill in the art that the disclosure may be practiced without these specific details. In other instances, well-known features have not been described in detail to avoid unnecessarily complicating the description.

FIG. 1A shows a network device in accordance with one or more embodiments disclosed herein. The network device (100) may represent a physical device or appliance configured, at least in part, to facilitate communications and/or interactions between network endpoints (not shown) (e.g., network servers, desktop computers, laptop computers, tablet computers, smartphones, or any other computing systems) that may be connected through a network or network topology (not shown) of network devices, or at least a portion thereof. The aforementioned network/network topology of network devices may include a datacenter network, a wide area network such as the Internet, a local area network, any other suitable network that facilitates the exchange of information from one part of the network/network topology to another, or any combination thereof.

In one or more embodiments disclosed herein, the network device (100) may include and/or may connect to persistent storage (not shown), memory (e.g., random access memory (RAM)) (not shown), one or more computer processor(s) (e.g., integrated circuits for processing instructions) (not shown), and two or more physical network interfaces (also referred to as ports) (not shown). The network device (100) may further include, and/or connect to, one or more network chip(s) or network processor(s) (not shown), which may reflect separate component(s) from the computer processor(s) thereon.

In one or more embodiments disclosed herein, a network chip, or network processor, may refer to any hardware (e.g., integrated circuit), software, firmware, and/or combination thereof, that may include functionality to receive, process, and/or transmit network traffic based on a programmed configuration thereon. In order to perform such functionality, a network chip/processor may include any number of subcomponents, which may include, but may not be limited to, integrated circuits, buffers (e.g., for implementing receive and/or transmit queues, such as virtual output queues (VOQs)), any type or amount of non-volatile storage, and/or any type or amount of volatile storage (e.g., RAM). Further, a network chip/processor may also include and/or connect to any number of network interfaces of the network device (100). Such interfaces may provide a path external to the network device (100) (e.g., to other network devices and/or network endpoints (not shown)), and/or may connect to other subcomponents internal to the network device (100), where each such interface may function as an ingress (also referred to as inbound) and/or egress (also referred to as outbound) interface.

As a non-limiting example, a network chip/processor may represent hardware that receives network traffic (e.g., media access control (MAC) frames, Internet Protocol (IP) packets, etc.) at an ingress port, and determines out of which egress port(s) on the network device (100) to forward the network traffic.

In one or more embodiments disclosed herein, the network device (100) may include functionality to receive network traffic (e.g., frames, packets, etc.) at any of the physical network interfaces (i.e., ports) of the network device (100), and to analyze the received network traffic in order to determine whether to: (i) drop the network traffic; (ii) process the network traffic; and/or (iii) transmit the network traffic, based on said processing, from one or more other physical network interfaces or ports of the network device (100) in accordance with one or more embodiments disclosed herein.

In one or more embodiments disclosed herein, the network device (100) may also include functionality to store (e.g., in persistent storage, in memory, etc.) any number of data structures for facilitating operation of at least some aspects of the network device (100). Examples of such data structures may include, but may not be limited to, a routing information base (RIB) (not shown) and a forwarding information base (FIB) (not shown). Moreover, the network device (100) may include software and/or firmware stored in any network device storage (not shown) and/or network device memory (not shown) (e.g., non-transitory computer readable mediums). Said software and/or firmware may include instructions, which, when executed by the computer processor(s) of the network device (100), enable the computer processor(s) to perform operations in accordance with one or more embodiments disclosed herein.

The software and/or firmware instructions may take form as computer readable program code, which may be stored, in whole or in part, temporarily or permanently, on a non-transitory computer readable medium such as a CD, DVD, storage device, a diskette, a tape, flash memory, physical memory, or any other computer readable storage medium. Specifically, the software and/or firmware instructions may correspond to computer readable program code that, when executed by the computer processor(s), may be configured to perform functionality related to embodiments disclosed herein. The functionality of the network device (100) is not limited to the aforementioned specific examples.

Examples of the network device (100) may include, but may not be limited to, a network switch, a network router, a multilayer network switch, a fibre-channel device, an InfiniBand® device, etc. Further, the network device (100) is not limited to the aforementioned specific examples.

In one or more embodiments disclosed herein, the network device (100) may include, but may not be limited to, a control plane (102) and a data plane (104). The control plane (102) may represent a portion of the network device (100) architecture responsible for determining where to send network traffic. The determinations may rely, at least in part, on a dynamically changing network topology maintained by the control plane (102) through the sharing of routing (and/or other networking) protocol information amongst the network device (100) and other network devices (not shown) of a network (not shown). The control plane (102) is illustrated and described in further detail with respect to FIG. 1B, below. The data plane (104), on the other hand, may represent another portion of the network device (100) architecture responsible for receiving, parsing, processing, modifying, and transmitting network traffic. Further, the data plane (104) may process and forward network traffic to one or many destination(s) (e.g., other network device(s), network endpoint(s), etc.) based on various data structures, policies, rules, and/or other information and instructions, which may be configured, managed, and updated by the control plane (102).

While FIG. 1A shows a configuration of components and/or subcomponents, other network device (100) configurations may be used without departing from the scope of the disclosure.

Figure 1B:
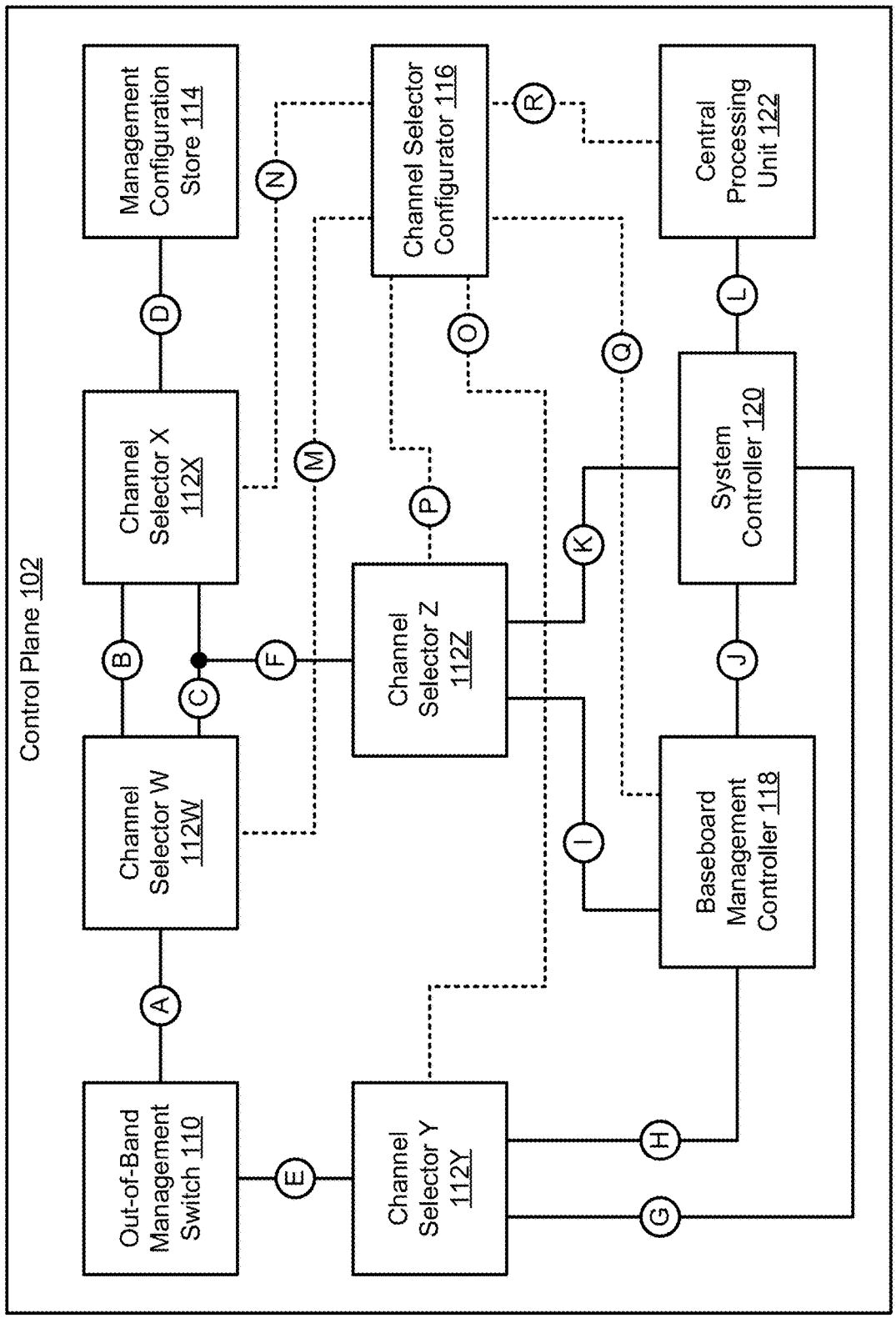
FIG. 1B shows a control plane in accordance with one or more embodiments disclosed herein.

FIG. 1B shows a control plane in accordance with one or more embodiments disclosed herein. The control plane (102) may include, but may not be limited to, an out-of-band (OOB) management switch (also referred herein as a management switch) (110), a set of channel selectors (112W-112Z), a management configuration store (114), a channel selector configurator (116), a baseboard management controller (BMC) (118), a system controller (120), and a central processing unit (CPU) (122). Each of these control plane (102) subcomponents is described below.

In one or more embodiments disclosed herein, the management switch (110) may refer to an integrated circuit (e.g., a specialized computer processor, or a system-on-a-chip (SoC)) at least configured to allow for remote monitoring and maintenance of the network device (see e.g., FIG. 1A). Said remote monitoring and maintenance may be enabled through a management network interface (not shown) on the network device, which may be connected to an OOB network. Contrary to an in-band network, which may include a set of interconnected network devices (including the network device on which the control plane (102) resides) that facilitate production network traffic, the OOB network may refer to another set of interconnected network devices (excluding the network device on which the control plane (102) resides yet connected thereto through the management network interface) that facilitate management and monitoring network traffic. The other set of interconnected network devices may allow said management and monitoring to continue even if the in-band network, in whole or in part, becomes unreachable or unusable.

In one or more embodiments disclosed herein, the management switch (110) may include functionality to: access, and read a management switch configuration from, the management configuration store (114) each time the management switch (110) resets or power-cycles (and/or each time the network device resets or power-cycles); and behave thereafter in accordance with the read management switch configuration. Said behavior may, for example, include how the management switch (110) may process data; and how the management switch (110) may interact with other hardware component(s) and/or signal(s) sent therefrom (e.g., for controlling light emitting diodes (LEDs)). One of ordinary skill will appreciate that the management switch (110) may perform other functionalities without departing from the scope of the disclosure, and that the behavior exhibited thereby is not limited to the aforementioned specific examples.

In one or more embodiments disclosed herein, a channel selector (112W-112Z) may refer to an integrated circuit (e.g., a multiplexer or de-multiplexer) at least configured to allow for multiple-input, single-output (or single-input, multiple-output) signal or data switching. To that end, a channel selector (112W-112Z) may include functionality to: receive instructions or programming from the channel selector configurator (116), which may be directed to a sought operational state (e.g., disabled, or enabled with a data channel segment selection) applicable to the channel selector (112W-112Z); and, based on the sought operational state, connect the single input (or output) (e.g., a data channel segment (described below)) to one of the multiple outputs (or inputs) (e.g., another data channel segment). By way of an example, concerning channel selector W (112W), there may be three programming options: (i) disable; (ii) enable with the selection of connecting data channel segment A to data channel segment B; or (iii) enable with the selection of connecting data channel segment A to data channel segment C.

In one or more embodiments disclosed herein, the management configuration store (114) may refer to a persistent data repository (e.g., implemented in non-volatile memory) where at least a management switch configuration may be stored. The management switch configuration may encompass a schema, in the form of enabled/disabled settings, instructions, etc., that implements a sought behavior or functionality targeting or concerning the management switch (110). That is, when read by the management switch (110), the management switch configuration may program or enable the management switch to, for example, process data and/or interact with other hardware component(s) and/or signal(s) sent therefrom (e.g., for controlling LEDs).

In one or more embodiments disclosed herein, the channel selector configurator (116) may refer to an integrated circuit (e.g., an input-output (IO) expander) at least configured to manage the set of channel selectors (112W-112Z) and to implement or apply one or more desired modes (see e.g., FIGS. 2A and 2B) when instructed. To that end, the channel selector configurator (116) may include functionality to: receive instructions from either the BMC (118) or the CPU (122) with respect to implementing/applying a desired mode (see e.g., FIGS. 2A and 2B); based on the received instructions, program the set of channel selectors (112W-112Z), or any appropriate subset thereof, to reflect the desired mode and thereby lead to the enablement of one or more data channels, and/or the disablement of one or more other data channels; and provide confirmation that the desired mode(s) have been implemented/applied to either the BMC (118) or the CPU (122).

In one or more embodiments disclosed herein, the BMC (118) may refer to an integrated circuit (e.g., a specialized computer processor, or a system-on-a-chip (SoC)) at least configured to coordinate the update (e.g., modification or replacement) of any existing management switch configuration, stored in the management configuration store (114), while the network device may be deployed or in-the-field. To that end, the BMC (118) may include functionality to perform the method illustrated and described with respect to FIG. 3, below. One of ordinary skill, however, will appreciate that the BMC (118) may perform other functionalities without departing from the scope of the disclosure.

In one or more embodiments disclosed herein, the system controller (120) may refer to an integrated circuit (e.g., a complex programmable logic device (CPLD)) at least configured to write to or update the management configuration store (114). To that end, the system controller (120) may include functionality to perform the method illustrated and described with respect to FIG. 5, below. One of ordinary skill, however, will appreciate that the system controller (120) may perform other functionalities without departing from the scope of the disclosure.

In one or more embodiments disclosed herein, the CPU (122) may refer to an integrated circuit (e.g., a computer processor) at least configured to coordinate the update (e.g., modification or replacement) of any existing management switch configuration, stored in the management configuration store (114), while the network device may be deployed or in-the-field. To that end, the CPU (122) may include functionality to perform the method illustrated and described with respect to FIG. 3, below. One of ordinary skill, however, will appreciate that the CPU (122) may perform other functionalities without departing from the scope of the disclosure.

In one or more embodiments disclosed herein, the control plane (102) may further include any number of data channels providing connections between or amongst the above-mentioned control plane (102) subcomponents. A data channel may refer to a unidirectional or bidirectional computer path (or information route), implemented through circuitry, that may be used for the passing of data and/or signals between control plane (102) subcomponents. Further, any data channel (or data channel segment (described below)) may support data and/or signal transfer or exchange by way of a given communication protocol or interface (e.g., microwire (μwire), serial peripheral interface (SPI), inter-integrated circuit ($I^2C$), management data input-output (MDIO), low pin count (LPC), system management bus (SMBus), general-purpose input-output (GPIO), etc.), which may be used by the pair of control plane (102) subcomponents being connected by the data channel. Moreover, any data channel may form from one or many data channel segment(s) (e.g., solid or dotted line(s) identified using the uppercase bubbled letter(s)). Each data channel segment, depicted in FIG. 1B, is tabularized below in TABLE 1, along with the alphanumeric identifiers belonging to the pair of control plane (102) subcomponents directly connected by the data channel segment, and the communication protocol(s) or interface(s) supported there-across.

TABLE 1

Data Channel Segment Mappings

| Data Channel Segment | Directly Connecting Subcomponents (IDs) | Communication Protocol/Interface |
|---|---|---|
| A | 110, 112W | µwire, SPI |
| B | 112W, 112X | µwire, SPI |
| C | 112W, 112X | µwire, SPI |
| D | 112X, 114 | µwire |
| E | 110, 112Y | MDIO |
| F | 112Z, 112X | µwire, SPI |
| G | 112Y, 120 | MDIO |
| H | 112Y, 118 | MDIO |
| I | 118, 112Z | SPI |
| J | 118, 120 | I²C |
| K | 112Z, 120 | µwire, SPI |
| L | 120, 122 | LPC |
| M | 112W, 116 | GPIO |
| N | 112X, 116 | GPIO |
| O | 112Y, 116 | GPIO |
| P | 112Z, 116 | GPIO |
| Q | 118, 116 | SMBus |
| R | 122, 116 | SMBus |

While FIG. 1B shows a configuration of components and/or subcomponents, other control plane (102) configurations may be used without departing from the scope of the disclosure. For example, in one or more embodiments disclosed herein, the control plane (102) may omit the BMC (118).

Figure 2A:
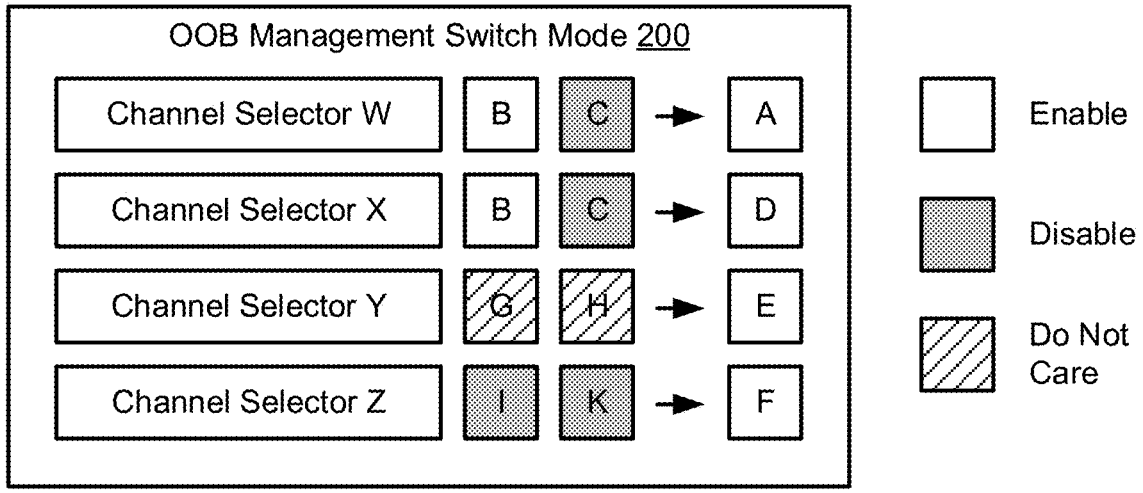
FIG. 2A shows a configuration for a set of channel selectors in accordance with one or more embodiments disclosed herein.

FIG. 2A shows a configuration for a set of channel selectors in accordance with one or more embodiments disclosed herein. The configuration may reflect operational states, respective to a set of channel selectors (see e.g., FIG. 1B), which when instructed or programmed by a channel selector configurator, implement an out-of-band (OOB) management switch mode (also referred to as a management switch mode) (200).

Further, any box outlining an uppercase letter, representative of an impacted data channel segment connected to a given channel selector, may be filled with (i) a clear (white) background, (ii) a dark (gray) background, or (iii) a patterned background. The clear/white background may reference a selected or enabled data channel segment; the dark/gray background may reference an unselected or disabled data channel segment; and the patterned background may reference a data channel segment that, at least in part, does not impact or aid in implementing the said management switch mode (200).

In one or more embodiments disclosed herein, in said management switch mode (200), a first data channel connecting an OOB management switch (or management switch) and a management configuration store may be enabled, while a second data channel connecting a system controller to the management configuration store may be disabled. The first data channel may form through the connections of data channel segments A, B, and D (see e.g., FIG. 1B), whereas the second data channel may alternatively form through the connections of data channel segments K, F, C, and D.

Further, in one or more embodiments disclosed herein, of the set of channel selectors, channel selectors A, B, and D (see e.g., FIG. 1B) are disposed along either or both of the first and/or second data channel(s). Accordingly, to effect the enablement of the first data channel, and the disablement of the second data channel: channel selector W may be enabled and programmed to connect data channel segment B (instead of data channel segment C) to data channel segment A; channel selector X may be enabled and programmed to connect data channel segment B (instead of data channel segment C) to data channel segment D; and channel selector Z may be disabled.

Moreover, in one or more embodiments disclosed herein, of the set of channel selectors, channel selector Y (see e.g., FIG. 1B) is not disposed along either or both of the first and/or second data channel(s). Accordingly, channel selector Y may not be programmed in order to apply the management switch mode (200).

Figure 2B:
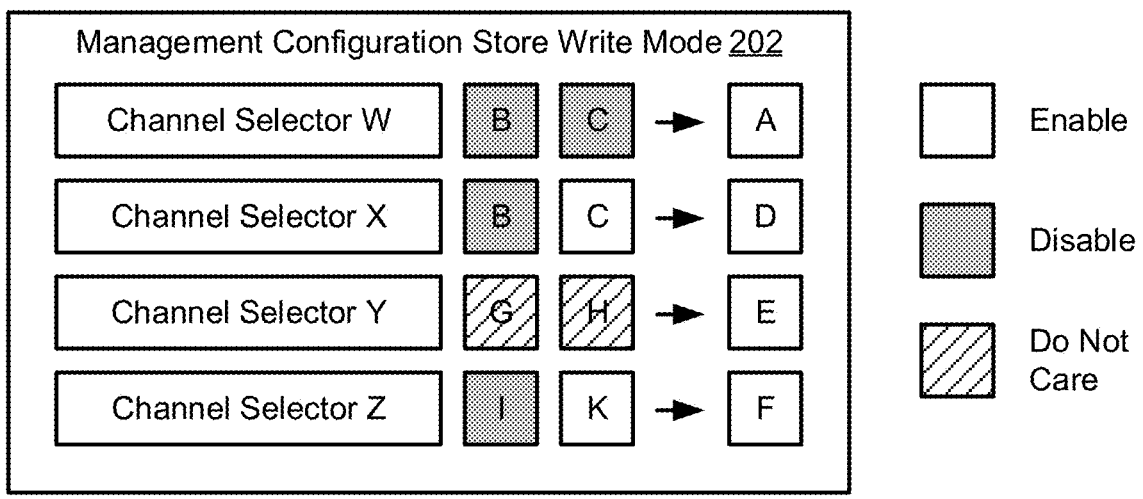
FIG. 2B shows a configuration for a set of channel selectors in accordance with one or more embodiments disclosed herein.

FIG. 2B shows a configuration for a set of channel selectors in accordance with one or more embodiments disclosed herein. The configuration may reflect operational states, respective to a set of channel selectors (see e.g., FIG. 1B), which when instructed or programmed by a channel selector configurator, implement a management configuration store write mode (202).

Further, any box outlining an uppercase letter, representative of an impacted data channel segment connected to a given channel selector, may be filled with (i) a clear (white) background, (ii) a dark (gray) background, or (iii) a patterned background. The clear/white background may reference a selected or enabled data channel segment; the dark/gray background may reference an unselected or disabled data channel segment; and the patterned background may reference a data channel segment that, at least in part, does not impact or aid in implementing the said management configuration store write mode (202).

In one or more embodiments disclosed herein, in said management configuration store write mode (202), a first data channel connecting an out-of-band (OOB) management switch (or management switch) and a management configuration store may be disabled, while a second data channel connecting a system controller to the management configuration store may be enabled. The first data channel may form through the connections of data channel segments A, B, and D (see e.g., FIG. 1B), whereas the second data channel may alternatively form through the connections of data channel segments K, F, C, and D.

Further, in one or more embodiments disclosed herein, of the set of channel selectors, channel selectors A, B, and D (see e.g., FIG. 1B) are disposed along either or both of the first and/or second data channel(s). Accordingly, to effect the disablement of the first data channel, and the enablement of the second data channel: channel selector W may disabled; channel selector X may be enabled and programmed to connect data channel segment C (instead of data channel segment B) to data channel segment D; and channel selector Z may be enabled and programmed to connect data channel segment K (instead of data channel segment I) to data channel segment F.

Moreover, in one or more embodiments disclosed herein, of the set of channel selectors, channel selector Y (see e.g., FIG. 1B) is not disposed along either or both of the first and/or second data channel(s). Accordingly, channel selector Y may not be programmed in order to apply the management configuration store write mode (202).

Figure 3:
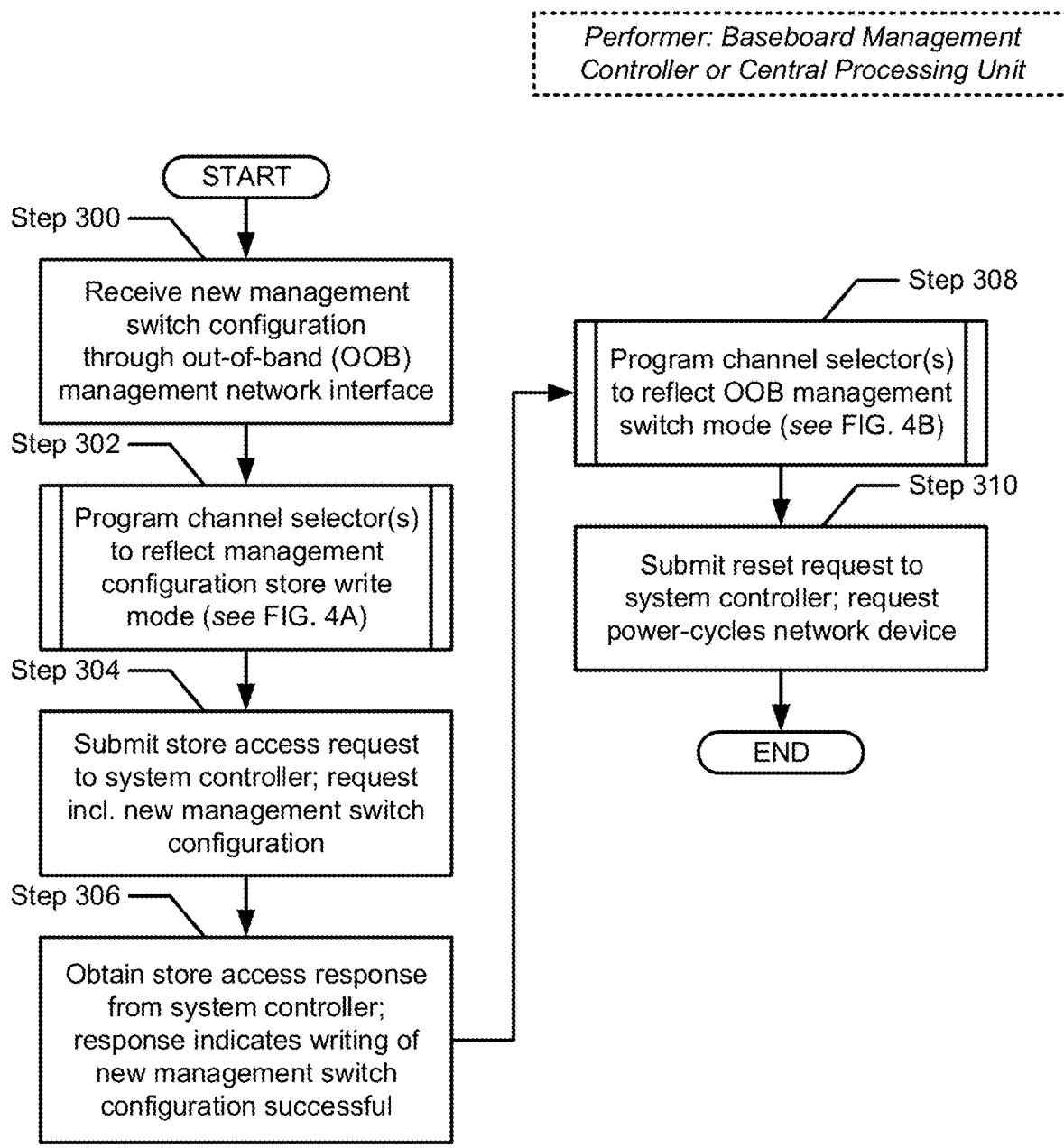
FIG. 3 shows a flowchart describing a method for updating management switch configurations on deployed network devices in accordance with one or more embodiments disclosed herein.

FIG. 3 shows a flowchart describing a method for updating management switch configurations on deployed network devices in accordance with one or more embodiments disclosed herein. The various steps outlined below may be performed by a baseboard management controller (BMC) or a central processing unit (CPU) (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a new management switch configuration is received by the BMC or CPU. In one or more embodiments disclosed herein, the new management switch configuration may encompass a schema, in the form of enabled/disabled settings, instructions, etc., that implements a sought behavior or functionality targeting or concerning a management switch (see e.g., FIG. 1B) of a network device. Further, the new management switch configuration may have been received through an out-of-band (OOB) management network interface on the network device. The OOB management network interface (also referred to herein as the management network interface) may refer to a dedicated network interface that connects the network device to an OOB network, which does not carry or propagate production network traffic and that may be used by administrators as a means to remotely monitor and maintain at least the network device.

In Step 302, a set of channel selectors is/are programmed by the BMC or CPU to reflect a management configuration store write mode (see e.g., FIG. 2B). In one or more embodiments disclosed herein, programming of the set of channel selectors may entail interaction with (e.g., the submitting of instructions to) a channel selector configurator (see e.g., FIG. 1B). Said programming is illustrated and described in further detail with respect to FIG. 4A, below.

In Step 304, a store access request is submitted by the BMC or CPU to a system controller (see e.g., FIG. 1B). In one or more embodiments disclosed herein, the store access request may pertain to gaining access to a management configuration store, which the system controller may regulate. Further, the store access request may include the new management switch configuration (received in Step 300).

In Step 306, in response to the store access request (submitted in Step 304), a store access response is obtained by the BMC or CPU from the system controller. In one or more embodiments disclosed herein, the store access response may indicate a status of the store access request, which may reflect the successful writing of the new management switch configuration (received in Step 300) into the management configuration store. The method (not the method disclosed through FIG. 3), conducted by the system controller, between receiving the store access request and providing the store access response, is illustrated and described in further detail with respect to FIG. 5, below.

In Step 308, the set of channel selectors (programmed in Step 302) is/are programmed by the BMC or CPU to reflect an OOB management switch mode (see e.g., FIG. 2A). In one or more embodiments disclosed herein, programming of the set of channel selectors may entail interaction with (e.g., the submitting of instructions to) a channel selector configurator (see e.g., FIG. 1B). Said programming is illustrated and described in further detail with respect to FIG. 4B, below.

In Step 310, a reset request is submitted by the BMC or CPU to the system controller. In one or more embodiments disclosed herein, the reset request may call for the system controller to reset or power-cycle the network device. Resetting or power-cycling the network device, in turn, may cause at least the management switch therein to reset or power-cycle. Further, the management switch, upon re-initialization following a reset or power-cycle, may be configured to read (or pull) its configuration (e.g., the new management switch configuration) stored in the management configuration store. Thereafter, the read configuration may govern the behavior of the management switch going forward.

Figure 4A:
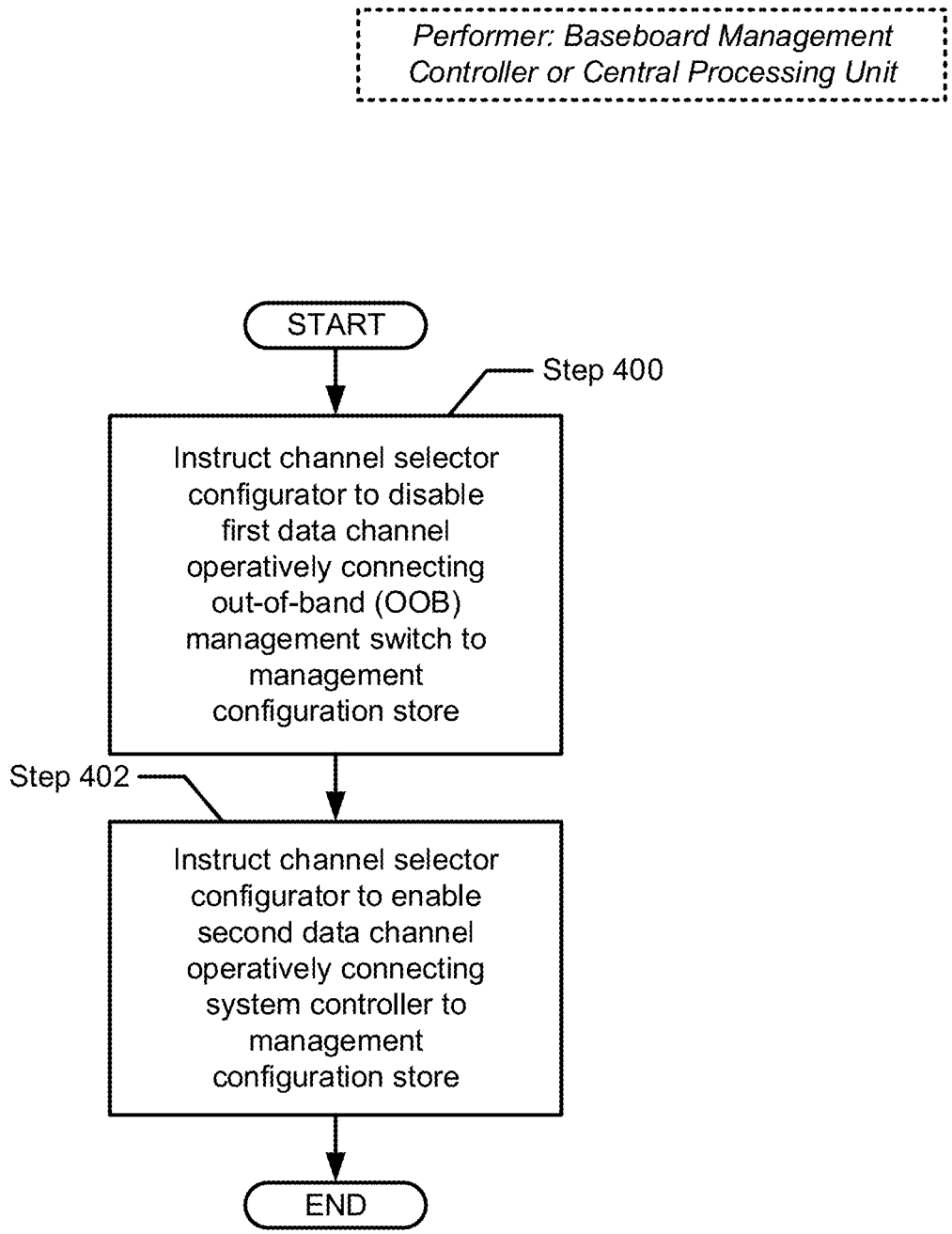
FIG. 4A shows a flowchart describing a method for programming a set of channel selectors in accordance with one or more embodiments disclosed herein.

FIG. 4A shows a flowchart describing a method for programming a set of channel selectors in accordance with one or more embodiments disclosed herein. Specifically, the method describes disabling a connection between an out-of-band (OOB) management switch (or management switch) and a management configuration store, while also enabling another connection between a system controller and the management configuration store. The various steps outlined below may be performed by a baseboard management controller (BMC) or a central processing unit (CPU) (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 4A, the method shown outlines a channel selector configurator (see e.g., FIG. 1B) being instructed to program a set of channel selectors to reflect a management configuration store write mode (see e.g., FIG. 2B).

That is, in Step 400, the channel selector configurator is first instructed by the BMC or CPU to disable a first data channel. In one or more embodiments disclosed herein, the first data channel may connect an out-of-band (OOB) management switch and a management configuration store. Further, by disabling said first data channel, access to the management configuration store, by the management switch, may be disallowed. In disallowing said access, the management switch, usually through the first data channel, cannot read any stored management switch configuration therefrom.

Thereafter, in Step 402, the channel selector configurator is subsequently instructed by the BMC or CPU to enable a second data channel. In one or more embodiments disclosed herein, the second data channel may connect a system controller (see e.g., FIG. 1B) and the management configuration store. Further, by enabling said second data channel, access to the management configuration store, by the system controller, may be permitted. In permitting said access, the system controller may proceed, through the second data channel, to interact with the management configuration store in order to modify or replace any existing management switch configuration stored therein.

Figure 4B:
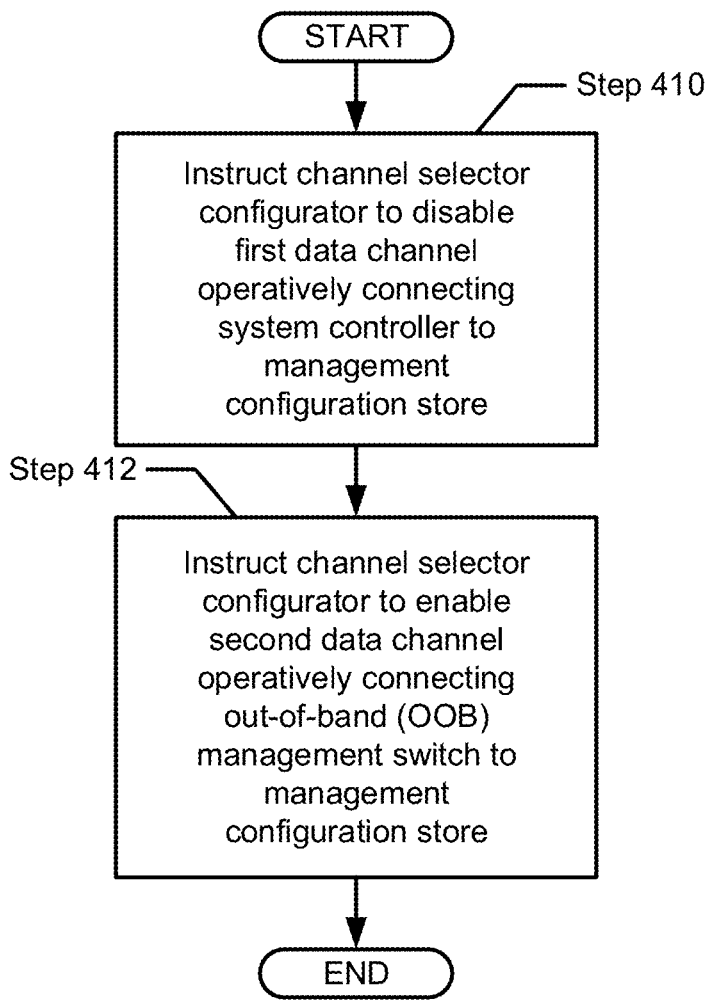
FIG. 4B shows a flowchart describing a method for programming a set of channel selectors in accordance with one or more embodiments disclosed herein.

FIG. 4B shows a flowchart describing a method for programming a set of channel selectors in accordance with one or more embodiments disclosed herein. Specifically, the method describes enabling a connection between an out-of-band (OOB) management switch (or management switch) and a management configuration store, while also disabling another connection between a system controller and the management configuration store. The various steps outlined below may be performed by a baseboard management controller (BMC) or a central processing unit (CPU) (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 4B, the method shown outlines a channel selector configurator (see e.g., FIG. 1B) being instructed to program a set of channel selectors to reflect an OOB management switch mode (see e.g., FIG. 2A).

That is, in Step 410, the channel selector configurator is first instructed by the BMC or CPU to disable a first data channel. In one or more embodiments disclosed herein, the first data channel may connect a system controller and a management configuration store (see e.g., FIG. 1B). Further, by disabling said first data channel, access to the management configuration store, by the system controller, may be disallowed. In disallowing said access, the system controller, usually through the first data channel, cannot modify or replace any existing management switch configuration stored in the management configuration store.

Thereafter, in Step 412, the channel selector configurator is subsequently instructed by the BMC or CPU to enable a second data channel. In one or more embodiments disclosed herein, the second data channel may connect a management switch (see e.g., FIG. 1B) and the management configuration store. Further, by enabling said second data channel, access to the management configuration store, by the management switch, may be permitted. In permitting said access, the management switch, following a or each reset thereof (by virtue of a or each reset of the network device), may proceed, through the second data channel, to interact with the management configuration store in order to read, and behave accordingly based on, any management switch configuration stored therein.

Figure 5:
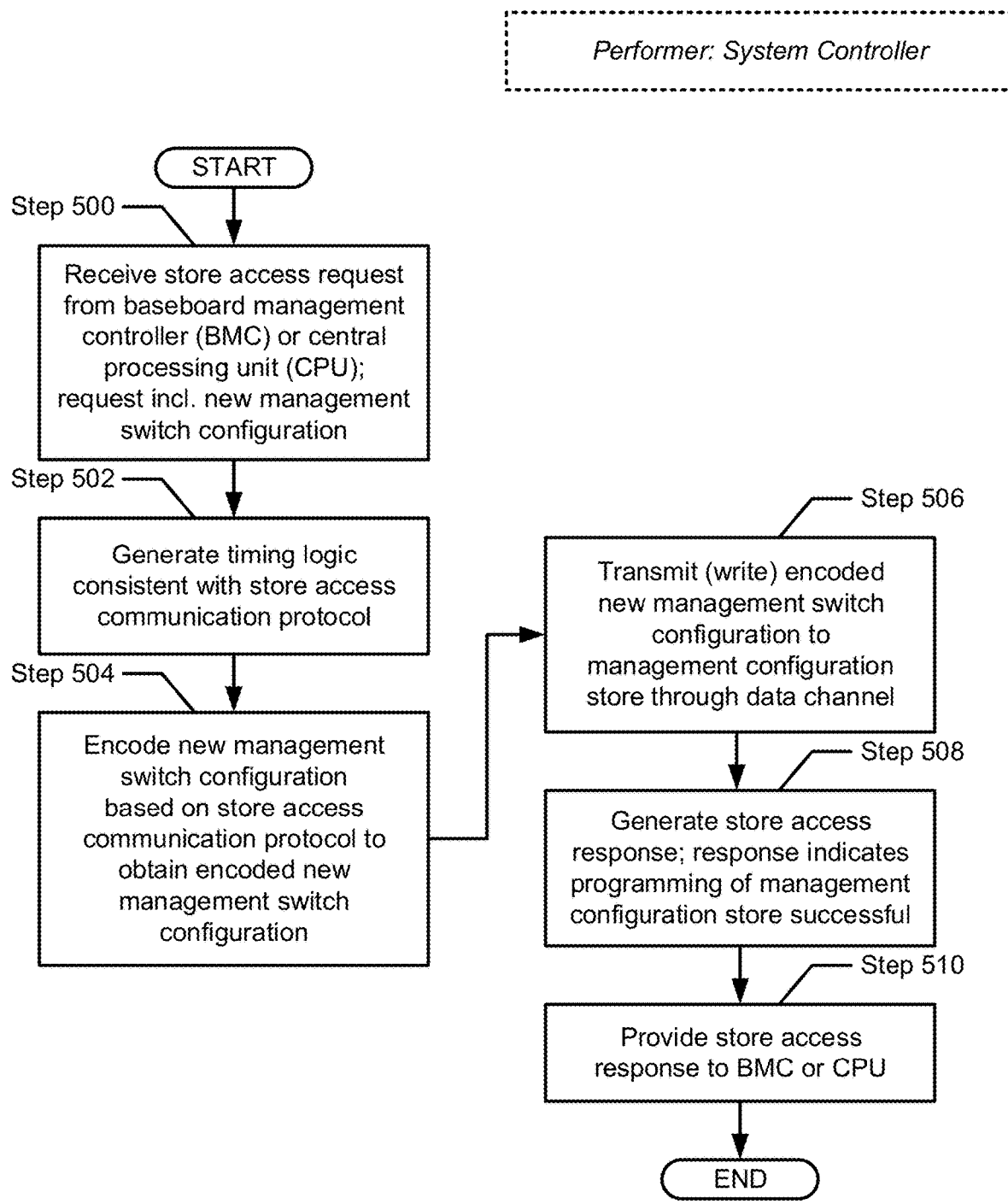
FIG. 5 shows a flowchart describing a method for updating management switch configurations on deployed network devices in accordance with one or more embodiments disclosed herein.

FIG. 5 shows a flowchart describing a method for updating management switch configurations on deployed network devices in accordance with one or more embodiments disclosed herein. The various steps outlined below may be performed by a system controller (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, a store access request is received by the system controller. In one or more embodiments disclosed herein, the store access request may originate from a baseboard management controller (BMC). In one or more other embodiments disclosed herein, the store access request may alternatively originate from a central processing unit (CPU). Further, the store access request may pertain to gaining access to a management configuration store, which the system controller may regulate. Moreover, the store access request may include a new management switch configuration. The new management switch configuration may encompass a schema, in the form of enabled/disabled settings, instructions, etc., that implements a sought behavior or functionality targeting or concerning the management switch (see e.g., FIG. 1B) of a network device.

In Step 502, in response to the store access request (received in Step 500), a timing logic is generated by the system controller. In one or more embodiments disclosed herein, the timing logic may refer to a clock signal consistent with, and used at least in, the transmission of data through a store access communication protocol. The store access communication protocol may represent a communication protocol (or interface) through which interaction (e.g., data transfer) with the management configuration store may be facilitated. Further, generation of the timing logic may utilize hardware accelerometers internal to the system controller. By way of an example, a microwire (µwire) protocol may be used as the store access communication protocol.

In Step 504, the new management switch configuration (received in Step 500) is encoded by the system controller based on the store access communication protocol (mentioned in Step 502). In one or more embodiments disclosed herein, said encoding may thereby lead to an encoded new management switch configuration being obtained.

In Step 506, the encoded new management switch configuration (obtained in Step 504) is transmitted (or written) to the management configuration store by the system controller. In one or more embodiments disclosed herein, transmission of the encoded new management switch configuration may rely on the timing logic (generated in Step 502). Further, depending on whether the store access communication protocol reflects a synchronous or asynchronous protocol, the timing logic may or may not be transmitted, alongside the encoded new management switch configuration, to the management configuration store. By way of an example, should the microwire (µwire) protocol, which reflects a synchronous protocol, represent the store access communication protocol, transmission may entail shifting of the data (e.g., encoded new management switch configuration) onto a serial data channel based on the timing logic, alongside providing the timing logic as a separate signal. The management configuration store, in turn, upon receiving the data and timing logic, may, based on the timing logic, decode the encoded new management switch configuration and extract the resulting new management switch configuration.

In Step 508, a store access response is generated by the system controller. In one or more embodiments disclosed herein, the store access response may indicate a status of the store access request (received in Step 500), which may reflect the successful writing of the new management switch configuration into the management configuration store.

In Step 510, the store access response (generated in Step 508) is subsequently provided by the system controller to the store access request source (e.g., the BMC or the CPU).

Figure 6A:
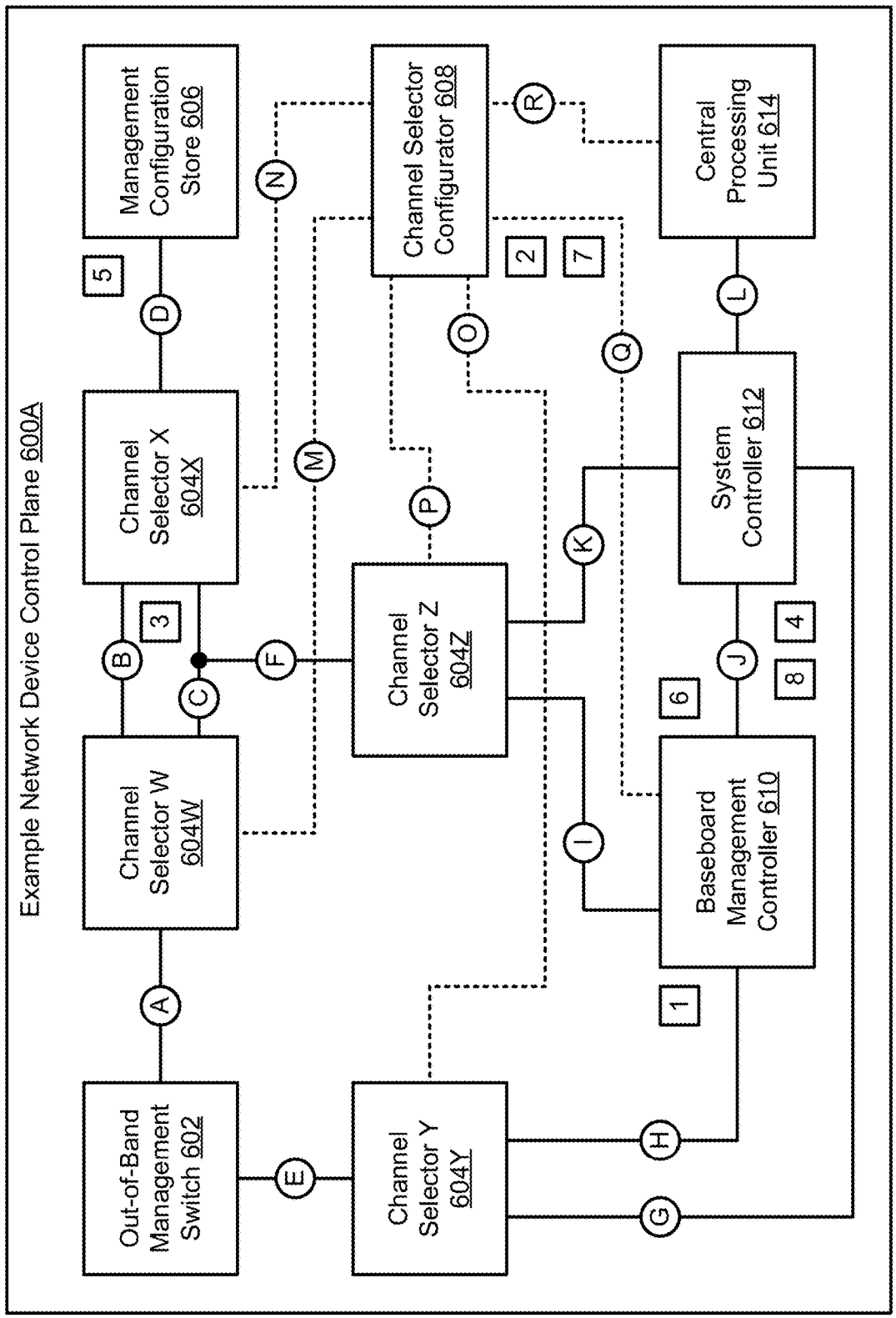
FIGS. 6A and 6B show exemplary scenarios in accordance with one or more embodiments disclosed herein.
Figure 6B:
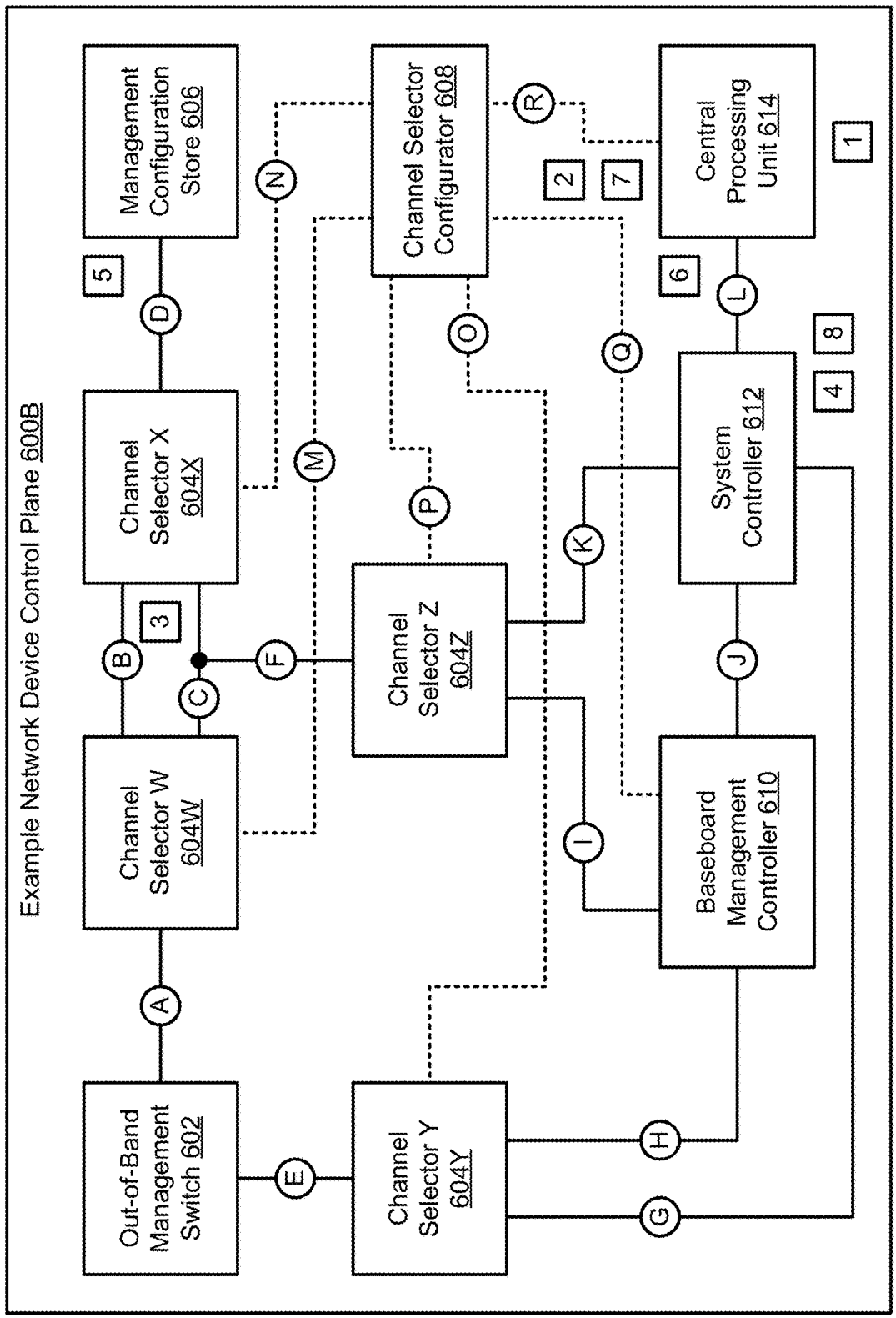

FIGS. 6A and 6B show exemplary scenarios in accordance with one or more embodiments disclosed herein. The exemplary scenarios, illustrated through FIGS. 6A and 6B and described below, are for explanatory purposes only and not intended to limit the scope of the disclosure. Further, FIG. 6A shows an exemplary scenario predominantly driven by a baseboard management controller (BMC), whereas FIG. 6B alternatively shows an exemplary scenario predominantly driven by a central processing unit (CPU).

Turning to FIG. 6A, consider the example network device control plane (600A) illustrated. Similar to the network device control plane shown in FIG. 1B, the example network device control plane (600A) may include a management switch (602), a set of channel selectors (604W-604Z), a management configuration store (606), a channel selector configurator (608), a baseboard management controller (BMC) (610), a system controller (612), and a central processing unit (CPU) (614).

Further, consider a scenario where the network device (not shown), on which the example network device control plane (600A) resides, has been deployed within a production network (not shown). Prior to its deployment, during a manufacturing phase of the network device, the management configuration store (606) is programmed to store an initial management switch configuration. When the network device is deployed and thus activated, the management switch (602) also initializes and immediately reads the initial management switch configuration from the management configuration store (606). Based on the initial management switch configuration, the management switch (602) behaves in accordance therewith. Thereafter, some arbitrary length-of-time following the deployment of the network device passes, at which point administrators seek to update (e.g., modify or replace) the initial management switch configuration while the network device remains deployed in-the-field. To accomplish this task in accordance with one or more embodiments disclosed herein, the task may be implemented as follows (with respect to the boxed numbers accompanying FIG. 6A):

1) The BMC (610) receives a new management switch configuration through a management network interface connected thereto;

2) The BMC (610), in turn, instructs the channel selector configurator (608) to apply a management configuration store write mode (see e.g., FIG. 2B);
3) The channel selector configurator (608), in turn, programs the set of channel selectors (604W-604Z) to reflect said management configuration store write mode, thereby leading to the disablement of a first data channel connecting the management switch (602) and the management configuration store (606), and the enablement of a second data channel connecting the system controller (612) and the management configuration store (606);
4) Upon receiving confirmation that the management configuration store write mode has been applied, the BMC (610) submits a store access request, including the received new management switch configuration, to the system controller (612);
5) The system controller (612), in turn, generates a timing logic consistent with, and encodes the new management switch configuration based on, a store access communication protocol (e.g., microwire (µwire)); then, the system controller (612) at least transmits a resulting encoded new management switch configuration to the management configuration store (606) via the recently enabled second data channel; where the management configuration store (606) receives and decodes the encoded new management switch configuration to obtain the new management switch configuration, which is subsequently stored therein;
6) The system controller (612), following the successful updating of the management configuration store (606) with the new management switch configuration, notifies the BMC (610) of said result;
7) The BMC (610), in turn, instructs the channel selector configurator (608) to apply a management switch mode (see e.g., FIG. 2A); the channel selector configurator (608), in turn, programs the set of channel selectors (604W-604Z) to reflect said management switch mode, thereby leading to the enablement of the first data channel connecting the management switch (602) and the management configuration store (606), and the disablement of a second data channel connecting the system controller (612) and the management configuration store (606);
8) Upon receiving confirmation that the management switch mode has been applied, the BMC (610) submits a reset request, to the system controller (612); the reset request asks for the system controller to reset or power-cycle the network device, thus also resetting or power-cycling at least the management switch (602); following said network device reset, the management switch (602) reads the new management switch configuration from the management configuration store (606) via the recently enabled first data channel, and proceeds to exhibit new behavior based on the read new management switch configuration.

Turning to FIG. 6B, consider the example network device control plane (600B) illustrated. Similar to the network device control plane shown in FIG. 1B, the example network device control plane (600A) may include a management switch (602), a set of channel selectors (604W-604Z), a management configuration store (606), a channel selector configurator (608), a baseboard management controller (BMC) (610), a system controller (612), and a central processing unit Further, consider a scenario where the network device (not shown), on which the example network device control plane (600B) resides, has been deployed within a production network (not shown). Prior to its deployment, during a manufacturing phase of the network device, the management configuration store (606) is programmed to store an initial management switch configuration. When the network device is deployed and thus activated, the management switch (602) also initializes and immediately reads the initial management switch configuration from the management configuration store (606). Based on the initial management switch configuration, the management switch (602) performs any number of initial maintenance operations concerning the network device. Thereafter, some arbitrary length-of-time following the deployment of the network device passes, at which point administrators seek to update (e.g., modify or replace) the initial management switch configuration while the network device remains deployed in-the-field. To accomplish this task in accordance with one or more embodiments disclosed herein, the task may be implemented as follows (with respect to the boxed numbers accompanying FIG. 6B):

1) The CPU (614) receives a new management switch configuration through a management network interface connected thereto;
2) The CPU (614), in turn, instructs the channel selector configurator (608) to apply a management configuration store write mode (see e.g., FIG. 2B);
3) The channel selector configurator (608), in turn, programs the set of channel selectors (604W-604Z) to reflect said management configuration store write mode, thereby leading to the disablement of a first data channel connecting the management switch (602) and the management configuration store (606), and the enablement of a second data channel connecting the system controller (612) and the management configuration store (606);
4) Upon receiving confirmation that the management configuration store write mode has been applied, the CPU (614) submits a store access request, including the received new management switch configuration, to the system controller (612);
5) The system controller (612), in turn, generates a timing logic consistent with, and encodes the new management switch configuration based on, a store access communication protocol (e.g., microwire (µwire)); then, the system controller (612) at least transmits a resulting encoded new management switch configuration to the management configuration store (606) via the recently enabled second data channel; where the management configuration store (606) receives and decodes the encoded new management switch configuration to obtain the new management switch configuration, which is subsequently stored therein;
6) The system controller (612), following the successful updating of the management configuration store (606) with the new management switch configuration, notifies the CPU (614) of said result;
7) The CPU (614), in turn, instructs the channel selector configurator (608) to apply a management switch mode (see e.g., FIG. 2A); the channel selector configurator (608), in turn, programs the set of channel selectors (604W-604Z) to reflect said management switch mode, thereby leading to the enablement of the first data channel connecting the management switch (602) and the management configuration store (606), and the disablement of a second data channel connecting the system controller (612) and the management configuration store (606);

8) Upon receiving confirmation that the management switch mode has been applied, the CPU (614) submits a reset request, to the system controller (612); the reset request asks for the system controller to reset or power-cycle the network device, thus also resetting or power-cycling at least the management switch (602); following said network device reset, the management switch (602) reads the new management switch configuration from the management configuration store (606) via the recently enabled first data channel, and proceeds to exhibit new behavior based on the read new management switch configuration.

In the above description of FIGS. 1A-6B, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'connected' and/or 'connection' may be used to describe any direct and/or indirect connection between components. As used herein, the aforementioned phrases may refer to any direct connection (e.g., wired connection directly between two or more components) or any indirect connection (e.g., wired and/or wireless connection between any number of components connecting the connected components).

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A network device deployed in a network, the network device comprising:
    a management configuration store storing a management switch configuration;
    a management switch connected to, and configured to read from, the management configuration store; and
    a system controller connected, and configured to write, to the management configuration store,
    wherein the management switch exhibits a first behavior based on the management switch configuration,
    wherein the system controller replaces the management switch configuration with a new management switch configuration, and
    wherein the management switch exhibits a second behavior based on the new management switch configuration.

2. The network device of claim 1, the network device further comprising:
    a computer processor connected, and configured to provide the new management switch configuration, to the system controller.

3. The network device of claim 2, wherein the computer processor is one selected from a group of computer processors comprising a baseboard management controller (BMC) and a central processing unit (CPU).

4. The network device of claim 2, the network device further comprising:
    a channel selector configurator connected to, and configured to receive instructions from, the computer processor.

5. The network device of claim 4, the network device further comprising:
    a set of channel selectors each connected to, and controlled by, the channel selector configurator.

6. The network device of claim 5, the network device further comprising:
    a data channel connecting the management switch and the management configuration store,
    wherein a first channel selector and a second channel selector, in the set of channel selectors, are disposed along the data channel, and
    wherein prior to the system controller replacing the management switch configuration with the new management switch configuration:
        the channel selector configurator programs the first and second channel selectors to disable the data channel.

7. The network device of claim 6, wherein after the system controller replaces the management switch configuration with the new management switch configuration, the channel selector configurator further programs the first and second channel selectors to enable the data channel.

8. The network device of claim 6, the network device further comprising:
    a second data channel connecting the system controller and the management configuration store,
    wherein the second channel selector, and a third channel selector in the set of channel selectors is, are further disposed along the second data channel, and
    wherein prior to the system controller replacing the management switch configuration with the new management switch configuration:
        the channel selector configurator further programs the second and third channel selectors to enable the second data channel.

9. The network device of claim 8, wherein after the system controller replaces the management switch configuration with the new management switch configuration, the channel selector configurator further programs the second and third channel selectors to disable the second data channel.

10. The network device of claim 5, wherein each channel selector, in the set of channel selectors, is implemented by a multiplexer.

11. A method for updating management switch configurations on deployed network devices, the method comprising:
    having a management configuration store storing a management switch configuration;

programming a set of channel selectors to reflect a management configuration store write mode; and submitting a store access request comprising a new management switch configuration, wherein, based on the store access request, the new management switch configuration replaces the management switch configuration.

12. The method of claim 11, wherein to program the set of channel selectors to reflect the management configuration store write mode, the method further comprises:

disabling a first data channel connecting a management switch and the management configuration store; and enabling a second data channel connecting a system controller and the management configuration store.

13. The method of claim 12, wherein replacing the management switch configuration with the new management switch configuration is performed through the second data channel.

14. The method of claim 12, the method further comprising:

after the new management switch configuration replaces the management switch configuration:

programming the set of channel selectors to reflect a management switch mode; and submitting a reset request directed to resetting a network device.

15. The method of claim 14, wherein to program the set of channel selectors to reflect the management switch mode, the method further comprises:

disabling the second data channel connecting the system controller and the management configuration store; and enabling the first data channel connecting the management switch and the management configuration store.

16. The method of claim 14, wherein the network device comprises the management switch, wherein resetting the network device also resets the management switch.

17. The method of claim 11, the method further comprising:

prior to programming the set of channel selectors to reflect the management configuration store write mode:

receiving the new management switch configuration through a management network interface of a network device.

18. A method for updating management switch configurations on deployed network devices, the method comprising:

having a management configuration store storing a management switch configuration;

receiving a store access request comprising a new management switch configuration; and updating, through a data channel enabling the updating, the management switch configuration with the new management switch configuration.

19. The method of claim 18, wherein the store access request is submitted by one selected from a group of computer processors comprising a baseboard management controller (BMC) and a central processing unit (CPU).

20. The method of claim 18, wherein the data channel supports a store access communication protocol for interfacing with the management configuration store.

* * * * *